(12) United States Patent
Yoshimura et al.

(10) Patent No.: US 7,255,806 B2
(45) Date of Patent: Aug. 14, 2007

(54) SUBSTRATE PROCESSING METHOD, METHOD OF MANUFACTURING MICRO LENS SHEET, TRANSMISSION SCREEN, PROJECTOR, DISPLAY DEVICE, AND SUBSTRATE PROCESSING APPARATUS

(75) Inventors: Kazuto Yoshimura, Suwa (JP); Jun Amako, Matsumoto (JP)

(73) Assignee: Seiko Epson Corporation (JP)

( * ) Notice: Subject to any disclaimer, the term of this patent is extended or adjusted under 35 U.S.C. 154(b) by 133 days.

(21) Appl. No.: 10/976,248

(22) Filed: Oct. 28, 2004

(65) Prior Publication Data

US 2005/0161436 A1 Jul. 28, 2005

(30) Foreign Application Priority Data

Oct. 31, 2003 (JP) .............................. 2003-371671
Aug. 6, 2004 (JP) .............................. 2004-230887

(51) Int. Cl.
*B44C 1/22* (2006.01)
*B23K 26/00* (2006.01)
(52) U.S. Cl. ............................ 216/65; 216/24; 216/26; 219/121.6; 219/121.67; 219/121.71
(58) Field of Classification Search .................. 216/24, 216/26, 65; 219/121.6, 121.71
See application file for complete search history.

(56) References Cited

U.S. PATENT DOCUMENTS

| 5,871,653 | A  | * | 2/1999 | Ling ............................... 216/2 |
| 6,168,910 | B1 | * | 1/2001 | Hino et al. .................. 430/328 |
| 6,497,701 | B2 | * | 12/2002 | Shimmick et al. ............. 606/5 |
| 6,633,433 | B2 | * | 10/2003 | Bergstein et al. ........... 359/569 |
| 2003/0047544 | A1 | * | 3/2003 | De Steur et al. ........ 219/121.71 |
| 2003/0189777 | A1 | * | 10/2003 | Iwasaki ....................... 360/25 |
| 2003/0192182 | A1 | * | 10/2003 | Hiramatsu et al. ............ 29/852 |

FOREIGN PATENT DOCUMENTS

| JP | 09-253877 | 9/1997 |
| JP | 2000-035616 | 2/2000 |

* cited by examiner

Primary Examiner—Shamim Ahmed
(74) Attorney, Agent, or Firm—Harness, Dickey & Pierce, P.L.C.

(57) ABSTRACT

A substrate processing method is provided including: shaping a laser beam emitted from a laser beam source into a beam having a focal depth larger than the maximum value of a variation in thickness of a processing area portion of a processed substrate and the maximum value of a variation in bend thereof by making the laser beam pass through an diffractive optical element; forming plural etching holes by irradiating the shaped beam onto a film formed on the substrate to remove the film; and forming plural recessed portions by etching the substrate through the plural etching holes.

9 Claims, 12 Drawing Sheets

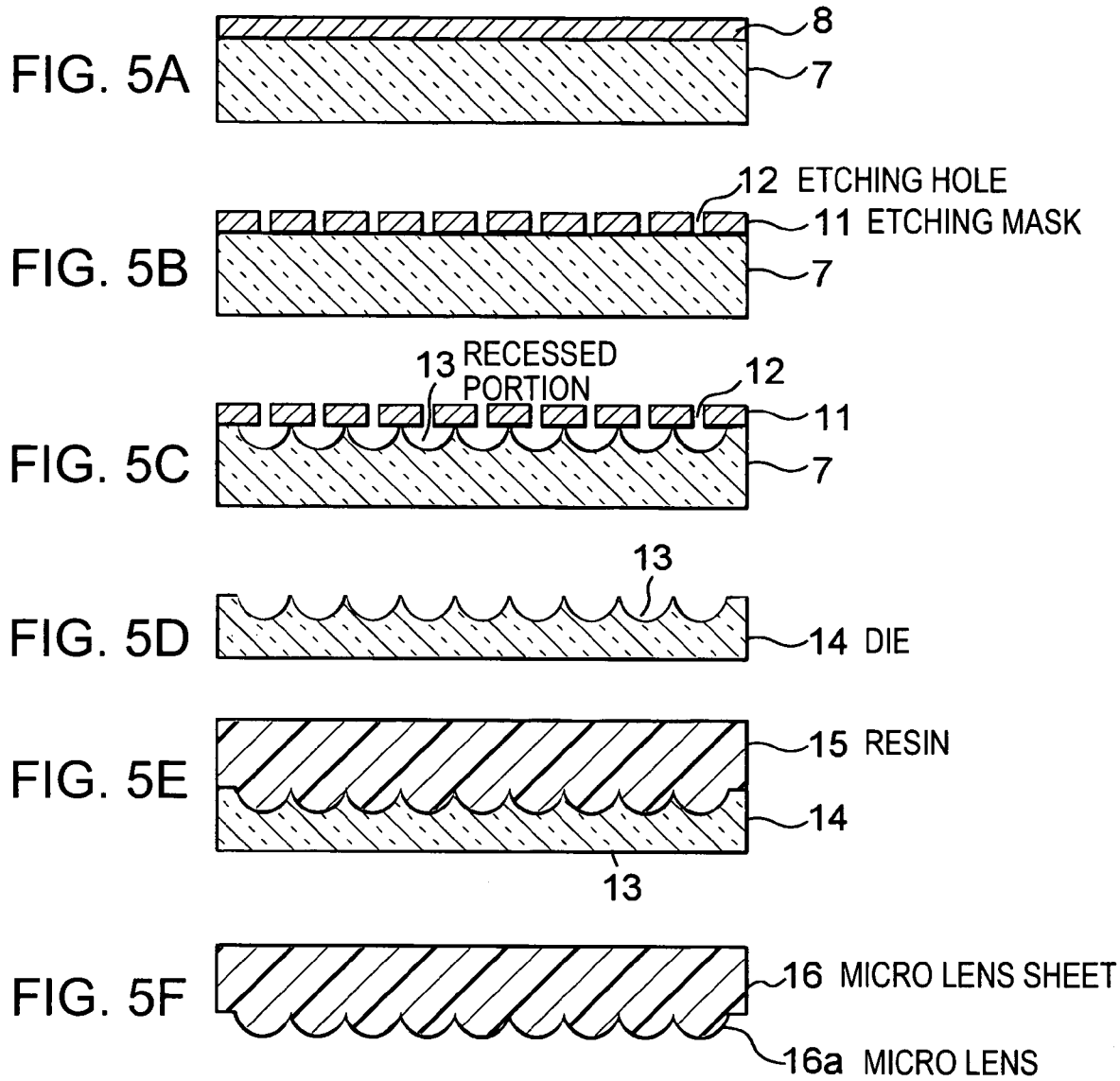

SUBSTRATE PROCESSING METHOD, METHOD OF MANUFACTURING MICRO LENS SHEET, TRANSMISSION SCREEN, PROJECTOR, DISPLAY DEVICE, AND SUBSTRATE PROCESSING APPARATUS

RELATED APPLICATIONS

This application claims priority to Japanese Patent Application Nos. 2003-371671 filed Oct. 31, 2003 and 2004-230887 filed Aug. 6, 2004 which are hereby expressly incorporated by reference herein in their entirety.

BACKGROUND

1. Technical Field

The present invention relates to a substrate processing method using a laser process or a laser process and an etching process and particularly to a fine processing method. The present invention also relates to a method of manufacturing a micro lens sheet using the processing method and a transmission screen having a micro lens sheet or array (a sheet or array including plural protrusion-shaped micro lenses) obtained using the method. The present invention also relates to a display device having the micro lens sheet, etc. and a projector having the transmission screen.

2. Related Art

Projection screens used for image projection devices such as rear projection televisions, etc. comprise a Fresnel sheet having plural Fresnel prisms for collimating incident light from projection lenses into substantially-collimated light and a micro lens sheet having plural micro lenses for diffusing the substantially-collimated light from the Fresnel lenses. Particularly, the micro lens sheet is formed by die-cutting thermoplastic resins, etc. with a die in which recessed portions are formed at the portions which form the micro lenses. When the die for a micro lens sheet is manufactured, as for the recessed portions which form the micro lenses, it is necessary to form etching holes for forming the recessed portions in a metal film provided on the surface of a substrate which forms the die. The etching holes could be formed using a laser process.

As a conventional laser processing method, there has been known a method of performing the processing while maintaining a difference between a focusing point and a processing point of a laser beam to be 50% or less of the focal depth so as to perform the processing with a high processing accuracy. That is, the height of an XYZ stage on which a processed subject is placed and which moves the processed subject in the X, Y, and Z axis (height) directions correspondingly to advance of the processing, is measured with a laser displacement gauge, the oscillation of a processing laser is stopped when the difference between the focusing point and the processing point becomes 50% or more of the focal length of the processing optical system, and the processing laser is oscillated when the height of the XYZ stage reaches the set position (for example, see Japanese Unexamined Patent Application Publication No. 9-253877 (see [0005], [0012], and FIG. 1)).

The conventional laser processing method described above is suitable for a case of forming holes having a depth of about 200 to 300 μm in a substrate having a thickness of 0.50 to 1.5 mm, for example, with a processing optical system having a focal depth of 30 to 50 μm.

On the contrary, for example, in the case of manufacturing a micro lens sheet to be used for a projection screen having a screen size of 70 inches, a substrate which forms a die for manufacturing the micro lens sheet is large in thickness and area, for example, a width of 1700 mm, a length of 1000 mm, and a thickness of 10 mm. In a substrate of such size, for example, a bend of ±500 μm might be caused, and also a thickness variation might be caused.

In the conventional laser processing method, since the focal depth of the processing optical system is small, there is a problem in that the etching holes (etching-start holes) having a desired shape and pitch could not be formed in a metal film formed on the substrate by adjusting the height of the XYZ stage because of variation in thickness or bend of the substrate. Further, in the conventional laser processing method, since the XYZ stage, the laser displacement gauge, etc. are required, there is a problem in that the apparatuses are complex and expensive.

Accordingly, the present invention is designed to solve the above-mentioned problem, and it is an object of the present invention to provide a processing method and a processing apparatus capable of fine-processing a metal film formed on a substrate, or the metal film and the substrate without influence of variation in thickness or bend of the substrate having a small thickness and a large area. In addition, it is another object of the present invention to provide a method of manufacturing a micro lens sheet using the processing method or the processing apparatus, a micro lens sheet manufactured with the processing method, and a transmission screen for a display device obtained using a shaping die.

SUMMARY

According to an aspect of the present invention, there is provided a substrate processing method comprising: a step of shaping a laser beam emitted from a laser beam source into a beam having a focal depth larger than the maximum value of a variation in thickness of a processing area portion of a substrate to be processed and larger than the maximum value of a variation in bend thereof by making the laser beam pass through an optical element for performing phase modulation on a wavefront of the laser beam; a step of forming plural etching holes by irradiating the shaped beam onto a film formed on the substrate to remove the film; and a step of forming plural recessed portions by etching the substrate through the plural etching holes.

As a result, even when a variation in thickness or a variation in bend exists in the substrate, it is possible to form desired etching holes in the substrate without performing height adjustment of the XYZ stage or measurement with the laser displacement gauge, so that a proper etching process can be carried out on the substrate and thus a desired shape can be obtained. This aspect is particularly advantageous in that the diameter and the focal depth of the shaped beam applied to the substrate to be processed can be freely optically adjusted.

In the above method, it is preferable that the shaped beam, having an intensity distribution where most optical energy is concentrated and localized on a predetermined area in the optical axis, is generated using a diffractive optical element as the optical element. As a result, it is possible to form desired etching holes on the substrate with simple and cost-effective laser optics.

In the above method, the shaped beam may be generated by dividing the laser beam emitted from the laser beam source into plural laser beams and diffracting the plural laser beams with a diffractive optical element provided for each laser beam. As a result, it is possible to efficiently form the desired etching holes in the substrate.

The above method may further comprise a step of further adjusting the intensity distribution of the shaped beam by making the shaped beam output from the diffractive optical element pass through an optical system in which a first lens having a first focal length, a spatial filter, and a second lens having a second focal length are sequentially provided. As a result, since the diameter of the beam can be smaller, it is possible to reduce a burden at the time of manufacturing the diffractive optical element as beam shaping means. Further, by restricting the focal depth to a necessary and sufficient range, it is possible to enhance the utilization efficiency of the shaped beam and to obtain the shaped beam having a more ideal intensity distribution.

In the above method, it is preferable that the diffractive optical element is a surface-relief diffractive optical element and the cross-sectional shape thereof is a saw-tooth shape. As a result, high light utilization efficiency can be accomplished. For example, when the ratio of the period of the diffractive optical element and the wavelength of the laser beam exceeds 2.0, a light utilization efficiency of 80% or more is obtained, and when the ratio is increased, a light utilization efficiency of 90% is obtained.

In the respective methods described above, a conic prism may be used in place of the diffractive optical element as the beam shaping means. Since the conic prism uses the refracting operation thereof and thus the wavelength dependency thereof is very small, one conic prism can be applied to plural laser beams having different wavelengths. In addition, substantially the same light utilization efficiency as that of the diffractive optical element is obtained.

In the respective methods described above, when the intensity distribution of the laser beam emitted from the laser beam source is a Gaussian distribution, the shaped beam or non-diffracting beam having a more preferable intensity distribution can be obtained.

When the substrate is formed out of a light-transmitting member, the shaped beam may be applied to the film from the side opposite to the side of the substrate on which the film is formed.

A lens array having plural concave lenses may be manufactured by processing a glass substrate or a resin substrate using any one of the above methods. As a result, it is possible to obtain a large-size lens array with high efficiency and at low cost.

A micro lens sheet shaping die having plural recessed portions may be manufactured by processing a substrate using any one of the above methods. As a result, it is possible to obtain a large-size micro lens sheet shaping die with high efficiency and at low cost.

According to another aspect of the present invention, there is provided a method of manufacturing a micro lens sheet having plural convex micro lenses by pressing glass or resin on a recessed-portion forming surface of the shaping die manufactured by the above method to transfer the shape of the shaping die to the glass or resin. As a result, it is possible to obtain a large-size micro lens sheet at low cost.

According to another aspect of the present invention, there is provided a transmission screen comprising a micro lens sheet or a micro lens array formed by utilizing the micro lens sheet shaping die manufactured with the above method as a casting mold, filling the shaping die with a resin and curing the resin, and then separating the shaping die from the resin. It is particularly preferable that the micro lens sheet manufactured with the method described above and a Fresnel sheet having Fresnel lenses are disposed parallel to each other to mutually face both lens surfaces thereof. As a result, it is possible to obtain a large-size projection screen at low cost.

According to another aspect of the present invention, there is provided a projector comprising the transmission screen and displaying an image through the transmission screen.

According to another aspect of the present invention, there is provided a display device, for example, a liquid crystal display device, comprising a micro lens sheet or a micro lens array formed by utilizing the micro lens sheet shaping die manufactured with the method according to claim 12 as a casting mold, filling the shaping die with a resin and curing the resin, and then separating the shaping die from the resin.

According to another aspect of the present invention, there is provided a substrate processing apparatus comprising: a laser beam source for emitting a laser beam; and one of a diffractive optical element and a conic prism for generating a shaped beam having an intensity distribution where most optical energy is concentrated and localized on a predetermined area in the optical axis by performing phase modulation on a wavefront of the laser beam, wherein the shaped beam has a focal depth larger than the maximum value of a variation in thickness of a processing area portion of a substrate to be processed and also larger than the maximum value of a variation in bend thereof. As a result, even when a variation in thickness or a variation in bend exists in the substrate, it is possible efficiently and surely to form desired etching holes in the substrate without performing height adjustment of the XYZ stage or measurement with the laser displacement gauge. It is preferable that the substrate processing apparatus further comprises an etching bath for etching the substrate irradiated with the shaped beam, thereby easily performing the etching process. When the etching process is performed, it is necessary to not attach foreign particles to the surface of the substrate.

BRIEF DESCRIPTION OF THE DRAWINGS

FIGS. 5A to 5F are diagrams illustrating a method of manufacturing a micro lens sheet.

DETAILED DESCRIPTION

First Embodiment

Figure 1:
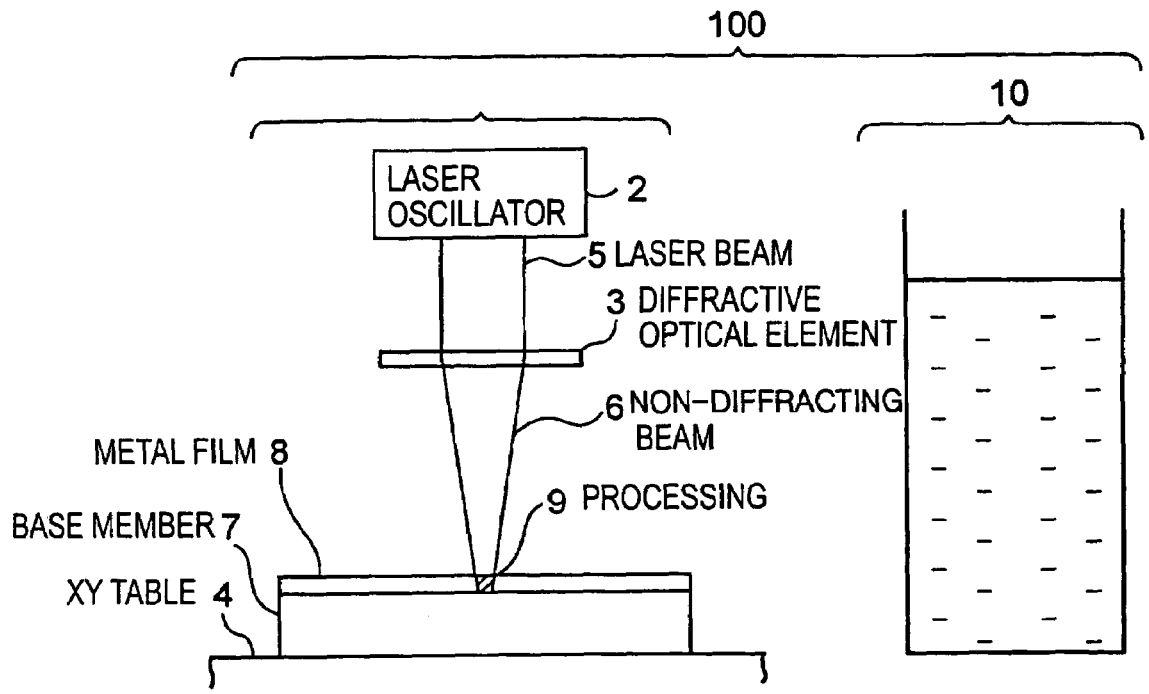
FIG. 1 is a schematic diagram illustrating a configuration of a substrate processing apparatus (including a laser processing apparatus and an etching bath) according to a first embodiment of the present invention.

FIG. 1 is a schematic diagram illustrating a configuration of a substrate processing apparatus according to a first embodiment of the present invention. The processing apparatus 100 comprises a laser processing apparatus 1 for primary processing and an etching bath 10 for secondary processing. However, the present invention may have only the laser processing apparatus 1 for primary processing and the etching bath 10 may be used as needed.

The laser processing apparatus 1 generally comprises a laser oscillator 2 serving as a laser beam source, a diffractive optical element 3 serving as beam shaping means for shaping an intensity distribution of a laser beam 5 emitted from the laser oscillator 2 into a predetermined shape, and an XY table 4 which is two-dimensionally movable. The laser oscillator 2 is, for example, an Nd:YAG (Neodymium: Yttrium Aluminum Garnet) laser and emits a pulse beam having, for example, a wavelength of 0.532 μm, a pulse width of 60 ns (repetition~1 KHz), and a beam diameter of 4 mm.

Figure 2A:
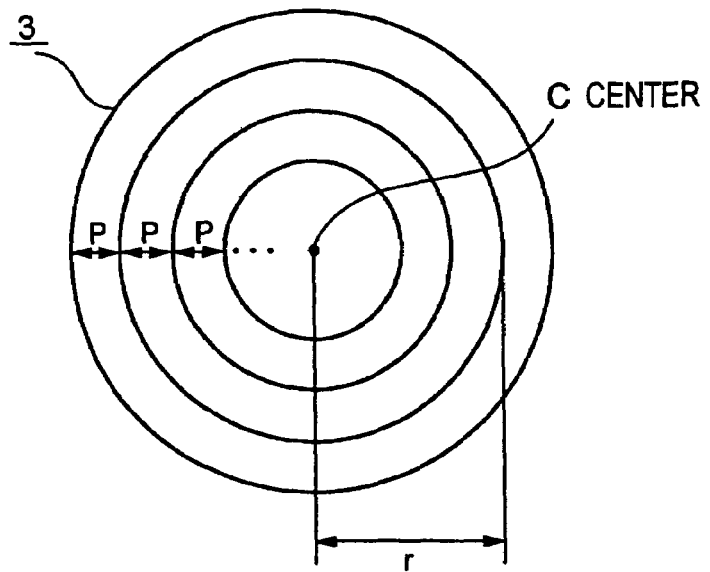
FIGS. 2A to 2B are views of a diffractive optical element.
Figure 2B:

The diffractive optical element 3 is a surface-relief diffractive optical element in which concentric patterns having an uneven shape and the same period p are formed on the surface of a transparent material such as fused silica, as shown in FIG. 2A. It is preferable that the sectional shape thereof be a saw-tooth shape as shown in FIG. 2B for light utilization efficiency.

Figure 3:
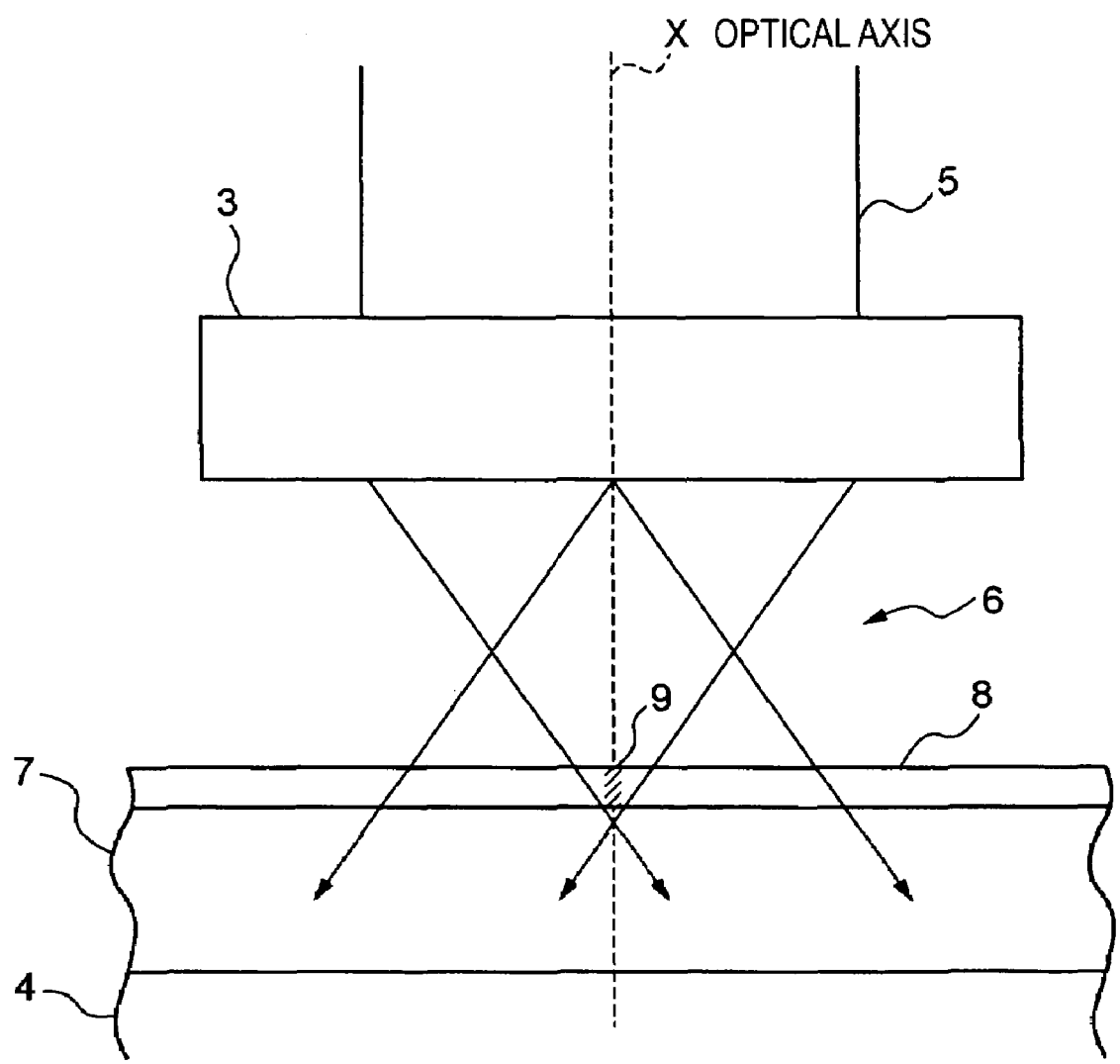
FIG. 3 is a schematic diagram illustrating a configuration of a main part of the laser processing apparatus constituting the processing apparatus according to a second embodiment of the present invention.

FIG. 3 is a schematic diagram illustrating a configuration of a main part of the laser processing apparatus. As shown in FIG. 3, the diffractive optical element 3 phase-modulates the wavefront of the laser beam 5 emitted from the laser oscillator 2, generates a shaped beam 6 having a predetermined intensity distribution in an optical axis direction and in a plane perpendicular to the optical axis direction and having a predetermined beam diameter and a predetermined focal depth, and applies the shaped beam 6 to a processing point 9 of a substrate 7 serving as a processing target of which the surface is formed with a metal film 8. In this example, the shaped beam 6 is a non-diffracting beam 6.

Now, a method of manufacturing the diffractive optical element 3 will be briefly described.

First, a resist is applied on a substrate that forms the diffractive optical element 3. The substrate is made of a transparent material for the wavelength of the laser beam. For example, fused silica can be used for the Nd:YAG laser (wavelength: 0.532 μm).

Next, the resist is exposed with a concentrated laser beam, thereby patterning the resist. At the time of exposure, the amount of exposure is changed in places depending upon a desired shape (herein, concentric patterns having the same period p). Thereafter, the resist is developed, thereby forming a resist pattern (pattern corresponding to an uneven-shape).

Next, the resist pattern is exposed to ionized gas (for example, $CHF_3$), and an ion etching process of transferring the pattern to the fused silica substrate is performed using the same pattern as a mask.

After performing the ion etching process, the remaining resist is removed, thereby forming the diffractive optical element 3 having a desired uneven shape on the fused silica substrate.

By increasing the number of levels of the uneven shape, the desired non-diffractive beam 6 can be generated with a high light utilization efficiency (>90%).

A phase distribution $\phi(r)$ of the diffractive optical element 3 for generating the non-diffractive beam 6 is obtained from the following equation (1):

$$\phi(r)=mod[2m\pi r/p] \quad (1)$$

where m denotes a diffraction order of a conical wavefront formed by the diffractive optical element 3, r denotes a radius of the diffractive optical element 3, λ denotes a laser wavelength, p denotes a period of the diffractive optical element 3, and the function mod[ ] replicates the phase distribution with 2π. The intensity distribution I(z) in the optical axis X of the non-diffracting beam 6 obtained from the phase distribution can be calculated from equation (2):

$$I(z)=C_1 z \cdot \exp(-C_2 z^2);$$

$$C_1=2\pi I_o \sin^2\theta, C_2=2\sin^2\theta/a^2 \quad (2)$$

where the intensity distribution of the laser beam 5 is a Gaussian distribution, $I(r)=I_o\exp(-2r^2/a^2)$, and a is a radius $(1/e^2)$. Here, $\sin\theta=m\lambda/p$, which means the beam shaping in the optical axis X using a diffracted wave of the m-th order. E denotes an exponential function.

From equation (2), the position $z_c$ where the intensity in the optical axis X is largest is obtained with the following equation (3) by differentiating equation (2):

$$z_c=(a/2)\cdot(p/\lambda)\cdot(1/m) \quad (3).$$

From this relationship, in accordance with the processing details, in order to change a distance in the optical axis X direction of the intensity distribution (a distance (depth) of the intensity distribution where the intensity reaches again 0 through the largest intensity from 0) and to change a predetermined level of the intensity distribution, for example, a depth of the intensity distribution portion whose intensity is 90% or more of the largest intensity, (i) it is necessary to change the period p of the diffractive optical element 3, or (ii) it is necessary to set the diffraction order m. From equation (3), the beam-intensity at the position $z_c$ where the intensity in the optical axis X is largest is calculated as follows:

$$I(z_c)=(\pi a I_0/\exp(1/2))m(\lambda/p) \quad (4).$$

From equation (4), when the period p of the diffractive optical element 3 is decreased, it can be seen that the beam intensity in the optical axis X is increased. When beam shaping is performed using the diffracted wave of a high order (m>1), the diffraction order m is increased, so that the beam intensity in the optical axis X is increased. In addition, the width W perpendicular to the optical axis X of the non-diffracting beam 6 can be obtained from the following equation:

$$W=0.766(p/m) \quad (5).$$

As can be seen from equation (5), even when the period p of the diffractive optical element is increased, it is possible to reduce the beam width W by setting the diffraction order m to be large. For example, when the period is 2p, the beam width W is W=0.766(2p/2)=0.766p by setting the diffraction order to m=2, which is the same as the case where the period is p and the diffraction order m is 1.

Figure 4A:
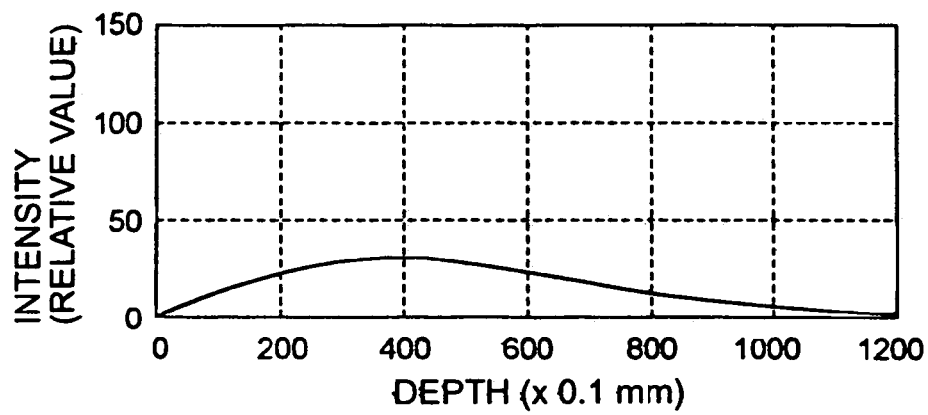
FIGS. 4A to 4C are diagrams illustrating examples of calculating an intensity distribution of the shaped beam according to the first embodiment.
Figure 4B:
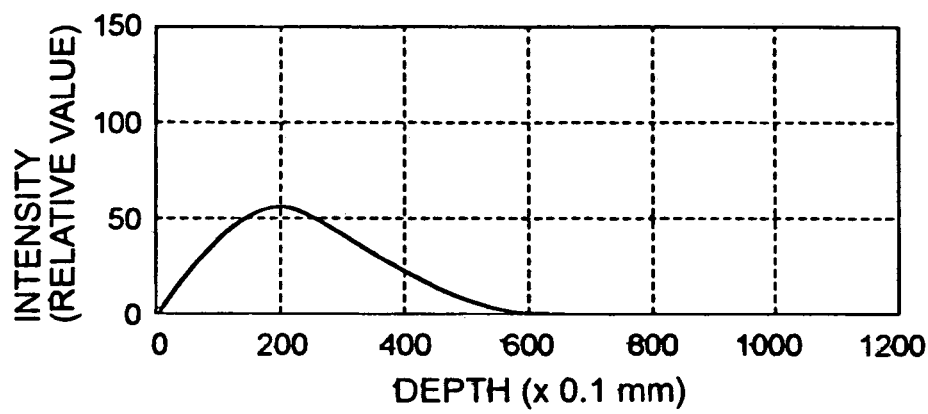
Figure 4C:
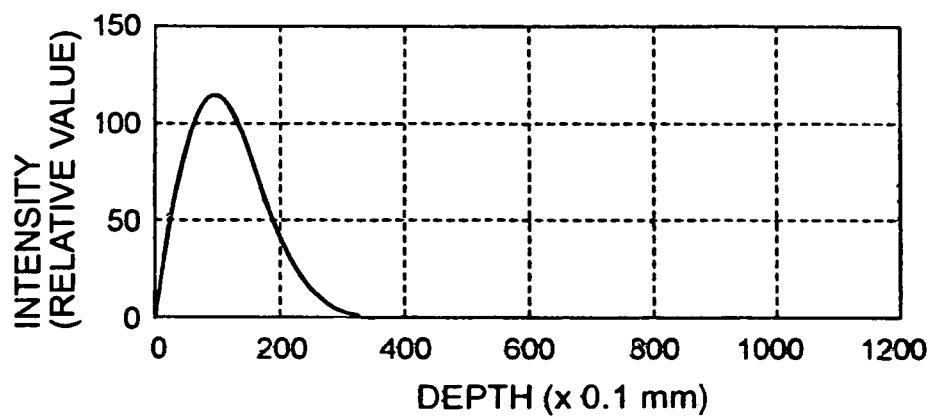

Calculation examples of the beam intensity distribution I(z) obtained from these relations are shown in FIGS. 4A to 4C. Herein, the calculation is performed using a pulsed laser which has a laser wavelength of λ=0.532 μm and a radius of the laser beam 5 of a=4.0 mm and using the diffracted wave whose diffraction order m is the first order (m=1).

In FIG. 4A, a case in which the period p of the diffractive optical element 3 is 20.0 μm is shown, where the beam width is 15 μm, the position z at which the intensity in the optical axis X is largest is 37.6 mm, and the depth (focal depth) of the intensity distribution portion larger than a predetermined level is about 60 mm. Herein, the focal depth is defined as a depth giving 90% or more of the largest intensity. In FIG. 4B, a case in which the period p of the diffractive optical element 3 is 10.0 μm is shown, where the beam width is 7.7 μm, the position z at which the intensity in the optical axis X is largest is 18.8 mm, and the focal depth is about 15 mm. In FIG. 4C, a case in which the period p of the diffractive optical element 3 is 5.0 μm is shown, where the beam width is 3.8 μm, the position z at which the intensity in the optical axis X is largest is 9.4 mm, and the focal depth is about 6 mm.

The substrate 7 to be processed becomes, for example, a shaping die for manufacturing a micro lens sheet-for constructing a projection screen of an image projection apparatus having a screen size of about 70 inches. The substrate 7 has, for example, a width of 1700 mm, a length of 1000 mm, and a thickness of 10 mm, and is made of a (e.g., soda) glass substrate or a non-alkali glass substrate or a fused silica substrate. The substrate 7 does not necessarily have a constant thickness in the processing area. In this specification, the difference between the largest thickness and the smallest thickness of the substrate is defined as "a maximum value of variation in thickness of a substrate". In addition, the substrate 7 bends in the processing area and the height of the top surface of the substrate is not necessarily constant. In this specification, the maximum value of the difference in distance from a reference plane in the thickness direction of the substrate to the top surface of the substrate is defined as "a maximum value of variation in bend of a substrate".

When the maximum value of variation in thickness or the maximum value of variation in bend of the processed substrate 7 is sufficiently smaller than the focal depth of the shaped beam obtained from the diffractive optical element 3, it is possible to easily perform the laser processing to plural points of the substrate 7 having the metal film 8 without adjusting the distance between the diffractive optical element 3 and the substrate 7.

Next, a method of manufacturing a micro lens sheet shaping die and a micro lens sheet using the processing apparatus will be described with reference to the processing diagram of FIGS. 5A to 5F.

The metal film (thin film) 8 is formed on the top surface of the substrate 7 (FIG. 5A) by forming a chromium oxide (CrO) film having a thickness of 10 nm using a chemical vapor deposition (CVD) apparatus or a physical vapor deposition (PVD) apparatus and then by forming a chrome (Cr) film having a thickness of 30 nm on the chromium oxide (CrO) film. Examples of the PVD apparatus can include a sputtering apparatus, a vacuum deposition apparatus, and an ion plating apparatus.

The substrate 7 having the metal film 8 is placed on the XY table 4 and is arranged to be movable in the X axis direction and the Y axis direction through the control means (not shown). The non-diffracting pulse beam 6 is irradiated onto the positions corresponding to micro lenses 16a of the micro lens sheet 16 to be finally obtained in the metal film 8 formed on the substrate 7 with the laser processing apparatus 1, thereby removing the metal film 8 and forming the etching holes (etching start holes) 12. By performing the processing several times while moving the XY table 4, the metal film 8 can be removed from the plural positions corresponding to the micro lenses 16a (FIG. 5B). As a result of the processing, the metal film remaining on the top surface of the substrate 7 serves as an etching mask 11 at the time of performing wet etching in the next step.

In the first embodiment of the present invention, the distance between the bottom surface of the diffractive optical element 3 and the metal film 8 is set to, for example, about 9 mm.

At the time of performing the processing with the laser processing apparatus 1, the optical axis X of the laser beam 5 incident on the diffractive optical element 3 is made to substantially coincide with the center of the diffractive optical element 3. The wavefront of the laser beam 5 incident on the diffractive optical element 3 is phase-modulated by the concentric patterns formed on the surface of the diffractive optical element 3 and has the same period p to form the non-diffracting beam 6 on the optical axis X and in the vicinity thereof, and the metal film 8 of the processing point 9 is removed by the central portion of the non-diffracting beam 6 having an intensity greater than a threshold value, thereby forming the etching holes 12. The hole diameter of the etching holes 12 is about 2 μm. The non-diffracting beam 6 may be irradiated onto the metal film 8 from the side opposite to the side of the substrate 7 on which the metal film 8 is formed.

Next, the substrate 7 is placed in the etching bath 10 containing an etching solution such as ammonium monohydrogen difluoride, and the recessed portions 13 are formed by performing the wet etching process to the substrate and removing a part of the substrate through the etching holes (FIG. 5C). Next, by removing the etching mask 11 using an etching solution such as ammonium ceric nitrate, the micro lens sheet shaping die 14 having plural recessed portions 13 formed therein is obtained (FIG. 5D).

Thereafter, by pressing a thermoplastic resin 15 such as PMMA (polymethacrylatemethyl (polymethylmethacrylate, acryl resin)) having a predetermined thickness on the top surface of the micro lens sheet shaping die 14 on which the recessed portions 13 are formed while heating them, the shape of the die 14 is transferred to the resin 15 (FIG. 5E). Next, by separating the resin 15 from the die 14, the micro lens sheet 16 having plural micro lenses 16a formed on one surface thereof is completed (FIG. 5F). In the first embodiment of the present invention, the lens diameter and the pitch of the micro lenses 16a are all 100 μm.

Figure 6:
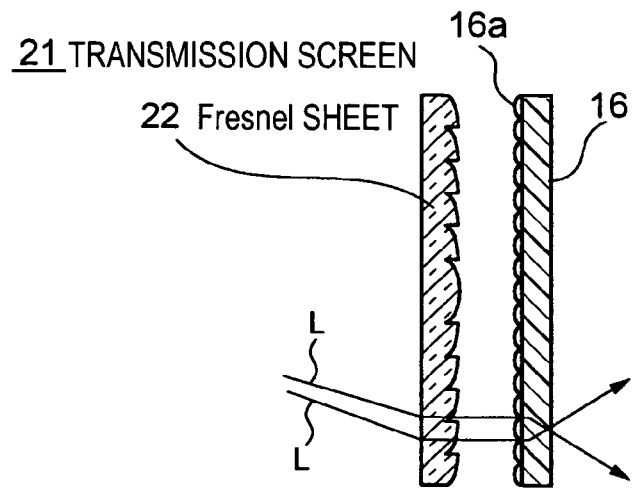
FIG. 6 is a diagram illustrating a configuration of a projection screen.

The micro lens sheet 16 completed in this way is disposed parallel to a Fresnel sheet 22, as shown in FIG. 6, such that the surface on which the plural micro lenses 16a are formed faces the surface of the Fresnel sheet 22 having Fresnel lenses, thereby constituting a transmission screen 21. When incident light L is applied from a projection unit (not shown), the Fresnel sheet 22 converts the incident light L into substantially-collimated light, and the micro lens sheet 16 diffuses the substantially-collimated light in a horizontal direction and in a vertical direction with the micro lenses 16a, thereby making the light (image) reach a user.

In the above embodiment, the diffractive optical element 3 for performing the phase modulation on the wavefront of the laser beam is provided, and the non-diffractive beam 6 having a predetermined intensity distribution through the diffractive optical element 3 and having a focal depth sufficiently larger than the maximum values of variation in thickness and bend of the processed substrate 7 is formed on the optical axis X and in the vicinity thereof. By irradiating the non-diffracting beam 6 onto the substrate 7, which forms a die for manufacturing the micro lens sheet having a large screen size, the etching holes 12 are formed in the metal film 8 to form the etching mask 11, and thereafter, the recessed portions 13 corresponding to the micro lenses are formed through wet etching.

Therefore, even when a slight variation in thickness or bend of, for example, about ±500 μm exists in the substrate 7 and for example, the metal film 8 made of the chrome (Cr) film having a thickness of several tens of nanometers is formed on the surface, it is possible to form the etching holes 12 having a desired shape with a desired gap, without keeping the distance between the lenses and the substrate constant using an expensive mechanical precise driving means such as an XYZ stage or a laser displacement gauge.

As a result, without influence of variation in thickness or bend of the substrate, it is possible in a short time to form the etching holes having a desired shape and a desired gap in the metal film formed on the substrate with a simple and low-cost structure and with high accuracy.

According to the configuration of this embodiment, the diffractive optical element 3 is a surface-relief diffractive optical element and the sectional shape thereof is a saw-tooth shape. As a result, it is possible to obtain high light utilization efficiency. For example, when the ratio of the period of the diffractive optical element 3 and the wavelength of the laser beam is larger than 2.0, a light utilization efficiency of 80% or more is obtained, and when the ratio is further increased, a light utilization efficiency of 90% or more is obtained.

Second Embodiment

Figure 7:
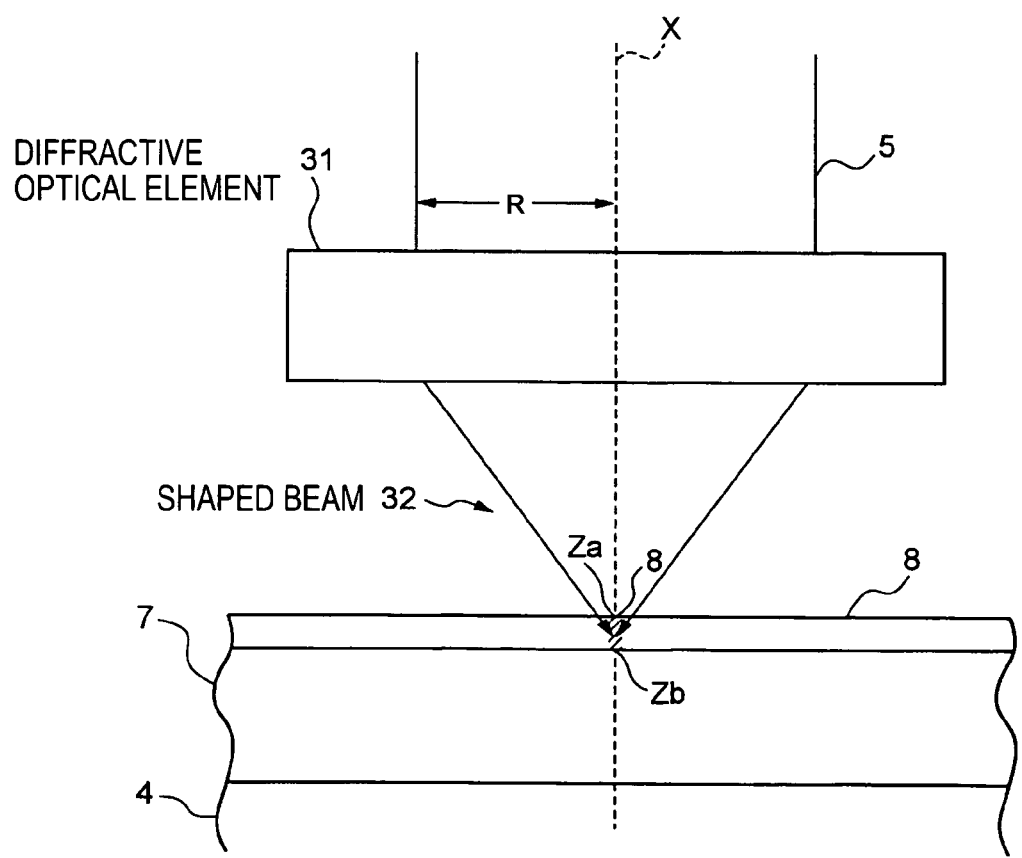
FIG. 7 is a schematic diagram illustrating a configuration of a main part of the laser processing apparatus constituting the processing apparatus according to the second embodiment of the present invention.

FIG. 7 is a schematic diagram illustrating a configuration of a main part of the laser processing apparatus used in a second embodiment in which the configuration of the laser processing apparatus 1 is modified. In FIG. 7, the constituent elements corresponding to the constituent elements of FIG. 3 are denoted by the same reference numerals and descriptions thereof are omitted. In FIG. 7, a diffractive optical element 31 is provided in place of the diffractive optical element 3 shown in FIG. 3. The diffractive optical element 31 is made of a transparent material such as fused silica, etc. and is a surface-relief diffractive optical element where unevenness is formed on the surface thereof and a sectional shape is a saw-tooth shape, but the period p is not formed at the equivalent interval unlike the diffractive optical element 3 according to the first embodiment. As shown in FIG. 7, the diffractive optical element 31 phase-modulates the laser beam 5 and generates the shaped beam 32 having a predetermined beam diameter and a predetermined focal depth and having a substantially-rectangular intensity distribution where most optical energy is concentrated and localized on a predetermined area on the optical axis X.

The phase distribution $\phi(r)$ of the diffractive optical element 31 is obtained from the following equation (6):

$$\phi(r)=(2\pi/\lambda)\int(r/z(r))dr \qquad (6)$$

where the integral interval is 0 to r. Herein, z(r) is a position where the shaped beam 32 emitted from the diffractive optical element 31 intersects the optical axis X and the position z(r) is calculated from the following equation (7):

$$z(r)=z_a+(z_b-z_a)(\int i(r)rdr)/(\int i(r)rdr) \qquad (7)$$

where the integral interval (numerator) is 0 to r and the integral interval (denominator) is 0 to R. $z_a$ and $z_b$ denotes the positions (which are measured with reference to the surface of the diffractive optical element 31. See FIG. 7) of both ends of the beam intensity distribution, i(r) denotes the intensity distribution of the laser beam 5, and R denotes the maximum radius of the laser beam 5.

Using the phase distribution ((r) of the diffractive optical element 31 obtained by substituting equation (7) into equation (6), the beam intensity distribution l(z) on the optical axis X of the shaped beam 32 can be calculated from equation (8) by Fresnel's integral formula:

$$I(z)=|\int\int\exp(ik(z^2+r^2)^{1/2}+\phi(r))[[x]](z/(z^2+r^2))rdrd\theta \\ [[]]|^2 \qquad (8),$$

where z is the coordinates on the optical axis X and the integral interval is $0\leq r\leq R$ and $0\leq\theta 2\pi$.

Figure 8A:
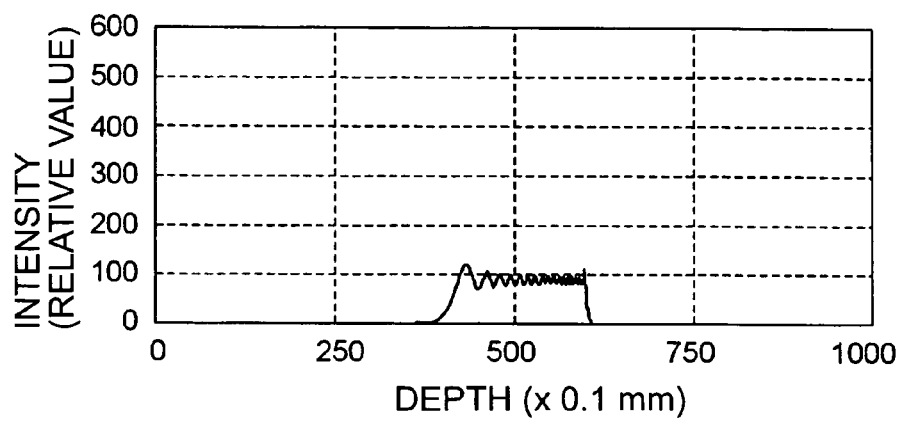
FIGS. 8A to 8C are diagrams illustrating examples of calculating the intensity distribution of the shaped beam according to the second embodiment.
Figure 8B:
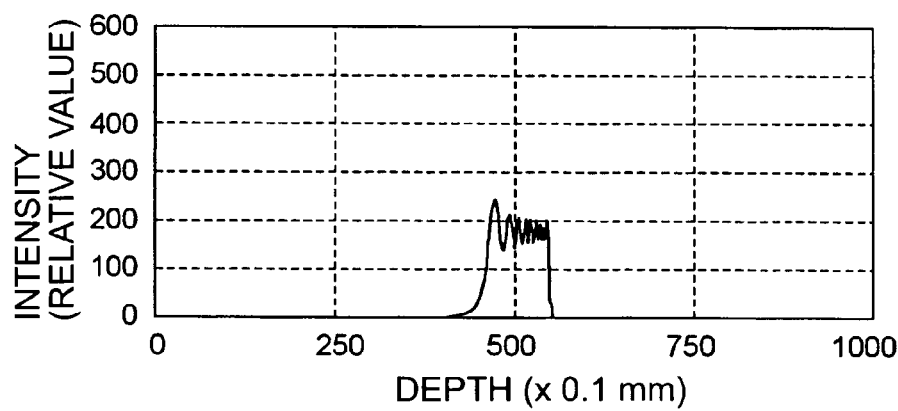
Figure 8C:
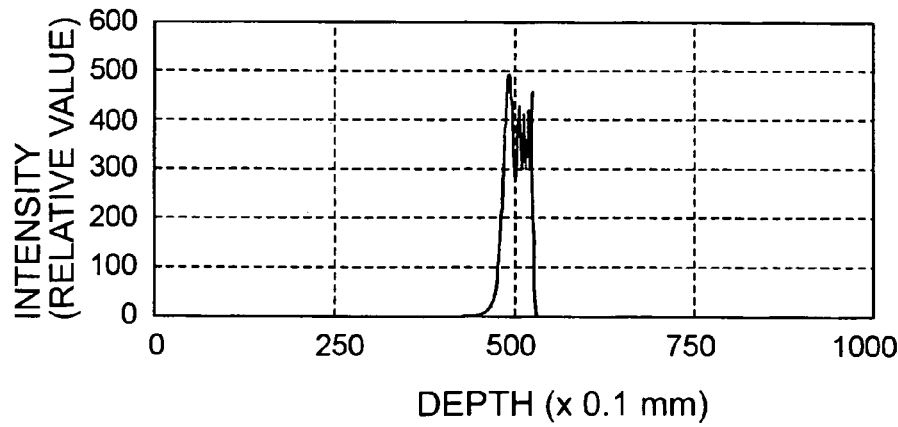

Calculation examples of the beam intensity distribution I(z) obtained from equation (8) are shown in FIGS. 8A to 8C. At the time of calculation, the laser beam 5 incident on the diffractive optical element 31 has a Gaussian distribution and a radius of the laser beam is a=3.0 mm. The central value of a predetermined area on the optical axis X in which the beam intensity distribution I(z) is formed is set to 50 mm.

In FIG. 8A, a case in which $z_a$ is 40.0 mm and $z_b$ is 60.0 mm is shown, where the depth (focal depth) of the intensity distribution portion on the optical axis X of a predetermined area is about 20 mm and the beam intensity distribution I(z) shown in FIG. 8B is obtained as a result of calculation based on the above numerical values. In FIG. 8B, a case in which $z_a$ is 45.0 mm and $z_b$ is 55.0 mm is shown, where the focal depth on the optical axis X of the predetermined area becomes about 10 mm and the beam intensity distribution I(z) shown in FIG. 8B is obtained as a result of calculation based on the above numerical values. In FIG. 8C, a case in which $z_a$ is 47.5 mm and $z_b$ is 52.5 mm is shown, where the focal depth on the optical axis X of the predetermined area becomes about 5 mm and the beam intensity distribution I(z) shown in FIG. 8C is obtained as a result of calculation based on the above numerical values.

When the maximum value of variation in thickness or the maximum value of variation in bend of the processed substrate 7 is sufficiently smaller than the focal depth of the shaped beam obtained from the diffractive optical element 31, it is possible to easily perform the laser processing to plural points of the substrate 7 without adjusting the distance between the diffractive optical element 31 and the substrate 7.

Next, a method of manufacturing a micro lens sheet shaping die using the laser processing apparatus having the above-mentioned configuration will be described. First, the metal film (thin film) 8 comprising the chromium oxide (CrO) film having a thickness of 10 nm and the chrome (Cr) film having a thickness of 30 nm formed on the chromium oxide (CrO) film are formed in advance on the surface of the substrate 7 using a CVD apparatus or a PVD apparatus.

Next, by forming the plural etching holes 12 at the positions corresponding to the micro lenses 16a in the metal film 8 formed on the substrate 7 using the shaped beam 32 having the intensity distribution shaped by the diffractive optical element 31 shown in FIG. 7 and the laser oscillator 2 shown in FIG. 1, the etching mask 11 is manufactured.

The formation of the etching holes 12 is executed as follows. That is, when the laser oscillator 2 is driven, the laser beam 5 is oscillated and is input to the diffractive optical element 31. At this time, the optical axis X of the laser beam 5 input to the diffractive optical element 31 is made to substantially coincide with the center of the diffractive optical element 31, as shown in FIG. 7. The wavefront of the laser beam 5 input to the diffractive optical element 31 is phase-modulated by the concentric patterns, which are formed on the surface of the diffractive optical element 31 and of which the period p is a function of a radius r, so that the shaped beam 32 having a rectangular intensity distribution in a predetermined area on the optical axis X is generated. The metal film 8 at the processing point is removed by the center portion of the shaped beam 32, thereby forming the etching holes 12. The hole diameter of the etching holes 12 is about 2 μm.

By moving the substrate 7 with the XY table 4 and performing the same laser processing at plural positions at which the etching holes 12 are formed, the etching holes 12 can be formed at all positions corresponding to the micro lenses. If only the etching holes 12 form the recessed portions corresponding to the micro lenses 16a, the size, shape, number, and arrangement thereof are not limited to the above description. The subsequent methods of manufacturing a micro lens sheet shaping die and a micro lens sheet are substantially equal to the method of manufacturing a micro lens sheet according to the first embodiment, and thus the description thereof will be omitted.

In the above example, the diffractive optical element 31 for performing the phase modulation on the wavefront of the laser beam is provided, the shaped beam 32 having the substantially-rectangular intensity distribution of which the focal depth is large is generated by the diffractive optical element 31, and the etching holes 12 are formed by removing the metal film 8 of the substrate 7 with the shaped beam 32.

Therefore, even when a bend of, for example, about (500 (m and a slight variation in thickness exist in the substrate 7 and for example, the metal film 8 made of the chrome (Cr) film having a thickness of several tens of nanometersnm is formed on the surface thereof, it is possible to form the etching holes 12 of a desired shape with a desired gap, without keeping the distance between the lenses and the substrate constant without using an expensive mechanical precise driving means such as an XYZ stage or a laser displacement gauge.

By changing the shape of the beam intensity distribution formed in a predetermined area on the optical axis X, it is possible easily to easily change the shape and the size of the etching holes 12 to be formed in the metal film 8.

As a result, without influence of a variation in thickness or warpagebend of the substrate, it is possible in a short time to form the etching holes having a desired shape and a desired gap in the metal film formed on the substrate with a simple and low-cost structure and with high accuracy. By making the sectional shape of the diffractive optical element 31 be a saw-tooth shape, the same advantages as the diffractive optical element 3 can be obtained.

Third Embodiment

Figure 9:
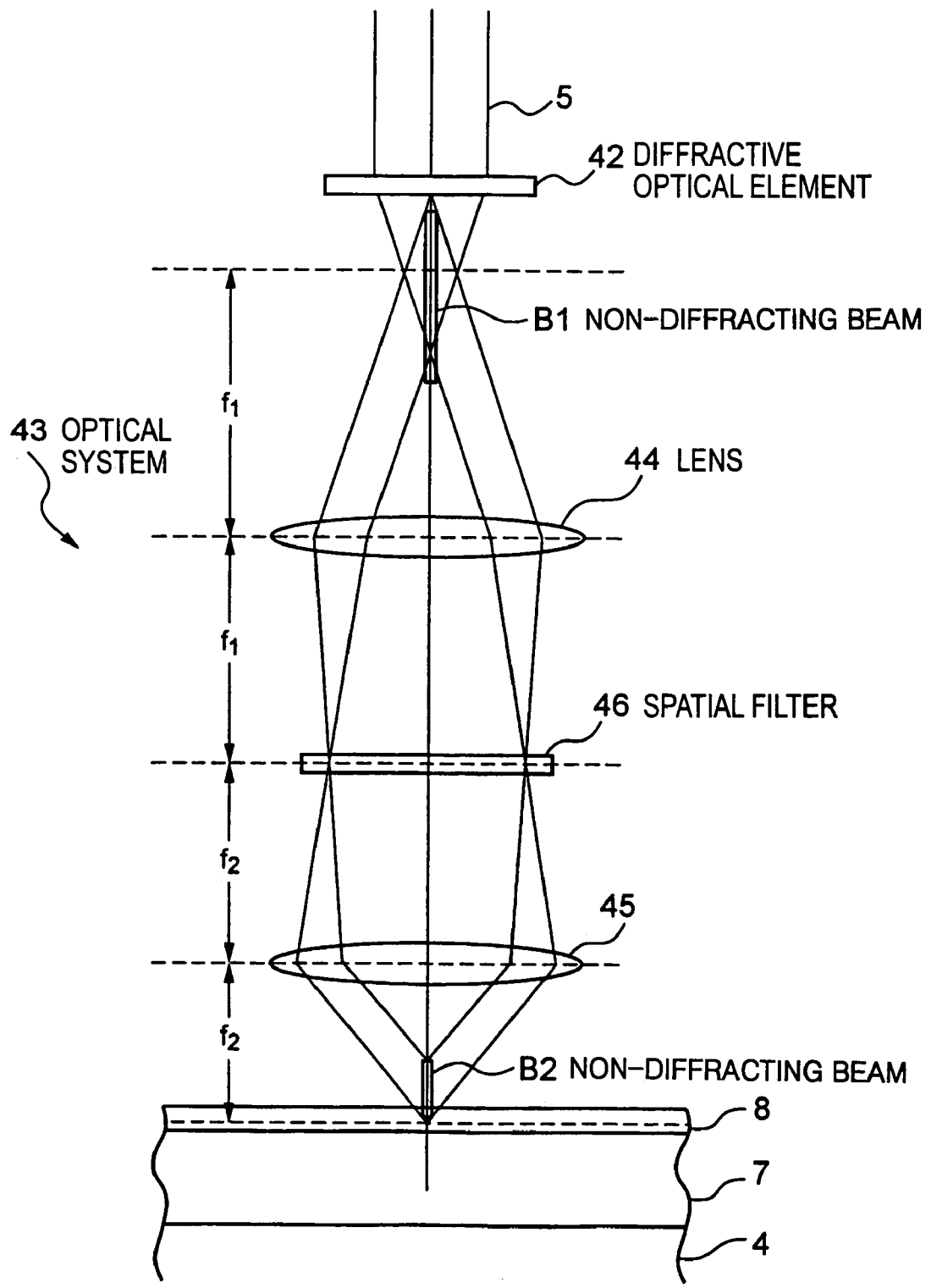
FIG. 9 is a schematic diagram illustrating a configuration of a main part of the laser processing apparatus constituting the processing apparatus according to a third embodiment of the present invention.

FIG. 9 is a schematic diagram illustrating a configuration of a main part of the laser processing apparatus used in a third embodiment in which the configuration of the laser processing apparatus 1 is modified. In FIG. 9, constituent elements corresponding to the constituent elements of FIG. 3 are denoted by the same reference numerals and descriptions thereof are omitted. In FIG. 9, an optical system 41 is provided in place of the diffractive optical element 3 shown in FIG. 3. The optical system 41 comprises a diffractive optical element 42 and an optical system 43. The diffractive optical element 42 is a surface-relief diffractive optical element where equivalent concentric patterns having an uneven shape and a relatively large period p (for example, 20 μm) are formed on the surface of a transparent material such as fused silica, etc., and a sectional shape thereof is a saw-tooth shape. As shown in FIG. 9, the diffractive optical element 42 generates (from the laser beam 5) a shaped beam (herein, a non-diffracting beam B1) having a predetermined beam diameter (for example, 15 μm) and a predetermined focal depth.

The optical system 43 comprises lenses 44 and 45 and a spatial filter 46. In FIG. 9, $f_1$ is a focal length of the lens 44 and $f_2$ is a focal length of the lens 45. The lenses 44 and 45 form an optical system as a kind of imaging system referred to as a so-called confocal system, which reduces the non-diffracting beam B1 generated by the diffractive optical element 42 and generates a non-diffracting beam B2. The spatial filter 46 is a ring-shaped opening, which transmits only a Fourier transform pattern (ring light) of the non-diffracting beam B1 and intercepts unnecessary diffracted light overlapping with the non-diffracting beam B1.

Here, assuming that the beam diameter and the focal depth of the non-diffracting beam B1 are $w_1$ and $z_1$, respectively, and the beam diameter and the peak position of the non-diffracting beam B2 are $w_2$ and $z_2$, respectively, then the relationship indicated by equation (9) and equation (10) is established:

$$w_2 = (1/M)w_1 \qquad (9)$$

$$z_2 = (1/M)^2 z_1 \qquad (10)$$

where $M = f_1/f_2$ denotes an imaging magnification of the optical system 43. By properly selecting the imaging magnification M on the basis of this relationship, the non-diffracting beam B2 having a desired diameter and a desired focal depth can be generated. For example, when the focal length $f_1$ is 60 mm and the focal length $f_2$ is 15 mm, the imaging magnification M is 4. Accordingly, when the beam diameter of the non-diffracting beam B1 generated using the diffractive optical element 42 having a period p of 20 μm is 15 μm, the beam diameter of the non-diffracting beam B2 is 3.8 μm (=15/4) from equation (9).

In the third embodiment, the spatial filter 46 is disposed in a rear focal plane of the lens 44 which is a front focal plane of the lens 45. Therefore, even when unnecessary diffracted light is generated at the rear side of the diffractive optical element by the diffractive optical element 42, the unnecessary diffracted light is intercepted by the spatial filter 46, so that the shape of the intensity distribution of the non-diffracting beam B2 is improved and it is thus possible to establish a large ratio of the primary peak and the secondary peak.

The methods of manufacturing a micro lens sheet shaping die and a micro lens sheet with the laser processing apparatus having the above-mentioned configuration are substantially equal to those of the first and second embodiments, except that the method of generating the non-diffracting beam B2 is modified, and thus the description thereof will be omitted.

According to the configuration of this embodiment, the optical system 41 comprising the diffractive optical element 42 having a relatively-large period p and the optical system 43 is provided as the means for optically freely reducing the beam diameter and the focal depth of the non-diffracting beam B2. Therefore, the same advantages as the first and second embodiments are obtained. It is possible to generate the precise non-diffracting beam B2 having a beam diameter of several μm or less with the diffractive optical element which can be manufactured with technical ease, so that burdens in manufacturing the diffractive optical element 42 can be reduced. By limiting the focal depth to a necessary and sufficient range, the utilization efficiency of the non-diffracting beam B2 is enhanced, and since the intensity distribution of the laser beam 5 is a Gaussian distribution, it is possible to obtain the non-diffracting beam B2 having an ideal intensity distribution.

Fourth Embodiment

Figure 10:
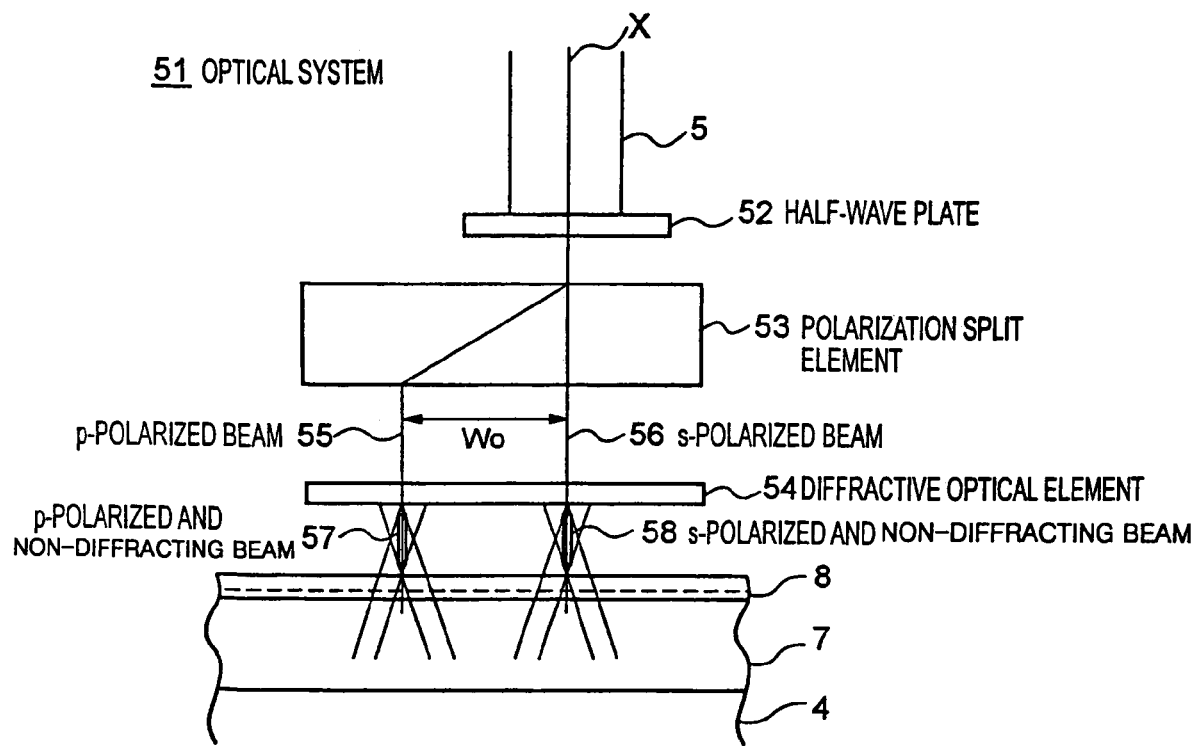
FIG. 10 is a schematic diagram illustrating a configuration of a main part of the laser processing apparatus constituting the processing apparatus according to a fourth embodiment of the present invention.

FIG. 10 is a schematic diagram illustrating a configuration of a main part of the laser processing apparatus used in a fourth embodiment in which the configuration of the laser processing apparatus 1 is modified. In FIG. 10, constituent elements corresponding to the constituent elements of FIG. 3 are denoted by the same reference numerals and descriptions thereof are omitted. In FIG. 10, an optical system 51 comprising a half-wave plate 52, a polarization split element 53, and a pair of diffractive optical elements 54 is provided in place of the diffractive optical element 3 shown in FIG. 3.

The half-wave plate 52 is made of a white mica plate cleaved in a proper thickness or a synthetic resin plate in which molecules are aligned in one direction, and is a birefringent plate whose thickness is determined to generate an optical path difference of ½ wavelength between linearly-polarized light beams (p-polarized beam and s-polarized beam) vibrating orthogonally to each other. Here, the p-polarized beam means a component parallel to the entrance plane of the laser beam 5 and the s-polarized beam means a component perpendicular to the entrance plane of the laser beam 5.

The polarization split element 53 is, for example, made of a laminated polarization split element having a multilayer film in which two different kinds of dielectric substances having different refractive indexes are alternately laminated. The polarization split element 53 spatially polarization-splits the incident laser beam into a p-polarized beam 55 and an s-polarized beam 56 which are two laser beams of polarized waves orthogonal to each other, using refractive index anisotropy resulting from the structural anisotropy. The intensity ratio of the p-polarized beam 55 and the s-polarized beam 56 is determined by adjusting the orientation of the half-wave plate 52. The separation gap (beam gap) $w_0$ between the p-polarized beam 55 and the s-polarized beam 56 is, for example, about 1 to 5 mm. It is necessary to set the beam diameter of the laser beam incident on the polarization split element 53 to be equal to or slightly smaller than the separation gap $w_0$. It is possible to adjust the separation gap $w_0$ with very high accuracy, by rotating the polarization split element 53. For example, when the initial separation gap $w_0$ is 4 mm, it is preferable that the polarization split element 53 be rotated by 1.3 degrees to reduce the separation gap $w_0$ by 1 μm. Similarly, it is preferable that the polarization split element 53 be rotated by 0.41 degrees to reduce the separation gap $w_0$ by 0.1 μm, and that the polarization split element 53 be rotated by 0.13 degrees to reduce the separation gap $w_0$ by 0.01 μm.

Figure 11:
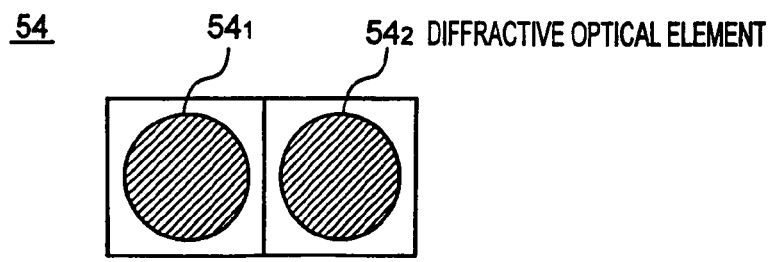
FIG. 11 is a plan view illustrating a pair of diffractive optical elements used in FIG. 10.

The pair of diffractive optical elements 54 is made of a pair of diffractive optical elements $54_1$ and $54_2$ having the same operation as the diffractive optical element 3, as shown in FIG. 11. The diffractive optical element $54_1$ is a surface-relief diffractive optical element in which concentric patterns having an uneven shape and the same period p (for example, 5 μm) are formed on the surface of a transparent material such as fused silica, as shown in FIG. 2 and the sectional shape is a saw-tooth shape. As shown in FIG. 10, the diffractive optical element $54_1$ phase-modulates the wavefront of the p-polarized beam 55 and generates a p-polarized non-diffracting beam 57 having a predetermined intensity distribution in an optical axis direction and in a plane perpendicular to the optical axis direction and having a predetermined beam diameter (for example, 3.8 μm) and a predetermined focal depth. Similarly, the diffractive optical element $54_2$ is a surface-relief diffractive optical element in which concentric patterns having the uneven shape shown in FIG. 2 and the same period p (for example, 5 μm) are formed on the surface of a transparent material such as fused silica, and the sectional shape is a saw-tooth shape. As shown in FIG. 10, the diffractive optical element $54_2$ phase-modulates the wavefront of the s-polarized beam 56 and generates a s-polarized non-diffracting beam 58 having a predetermined intensity distribution in an optical axis direction and in a plane perpendicular to the optical axis direction and having a predetermined beam diameter (for example, 3.8 μm) and a predetermined focal depth.

The methods of manufacturing a micro lens sheet shaping die and a micro lens sheet with the laser processing apparatus having the above-mentioned configuration are substantially equal to those of the first embodiment, except that two etching holes 12 are formed once, and thus the description thereof will be omitted.

According to the configuration of this embodiment, the laser beam 5 is split into the p-polarized beam 55 and the s-polarized beam 56 with the half-wave plate 52 and the polarization split element 53, and the p-polarized non-diffracting beam 57 and the s-polarized non-diffracting beam 58 are generated from the p-polarized beam 55 and the s-polarized beam 56 with the pair of diffractive optical elements 54. Therefore, in addition to the advantages obtained from the first embodiment, since two etching holes 12 are formed at once, it is possible to form the etching holes 12 having a desired shape and a desired gap in the metal film 8 formed on the substrate 7 in substantially half the time of that of the first embodiment.

Fifth Embodiment

Figure 12:
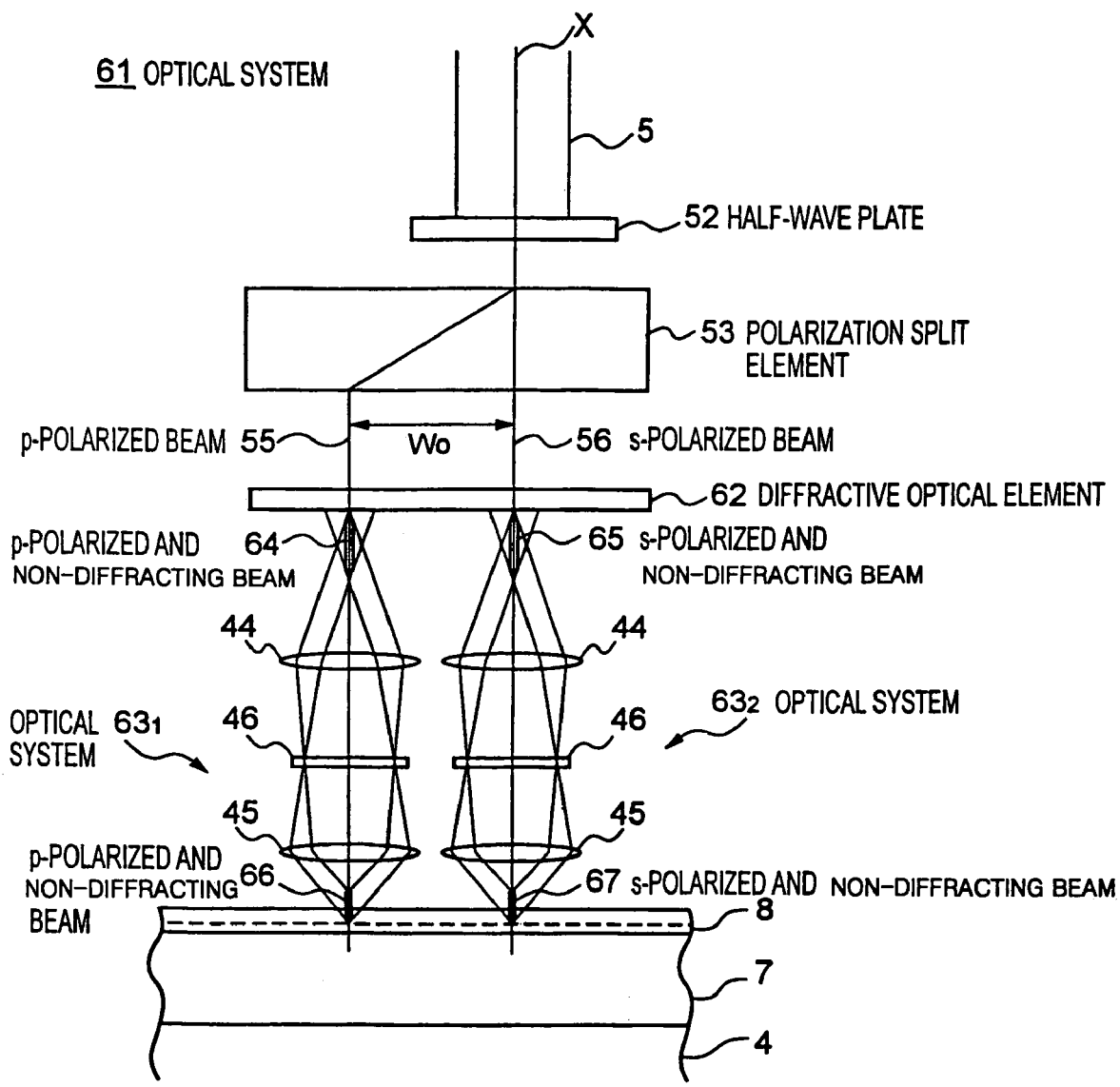
FIG. 12 is a schematic diagram illustrating a configuration of a main part of the laser processing apparatus constituting the processing apparatus according to a fifth embodiment of the present invention.

FIG. 12 is a schematic diagram illustrating a configuration of a main part of the laser processing apparatus used in a fifth embodiment in which the configuration of the laser processing apparatus 1 is modified. In FIG. 12, constituent elements corresponding to the constituent elements of FIG. 10 are denoted by the same reference numerals and descriptions thereof are omitted. In FIG. 12, an optical system 61 comprising a half-wave plate 52, a polarization split element 53, a pair of diffractive optical elements 62, and optical systems $63_1$ and $63_2$ is provided in place of the optical system 51 shown in FIG. 10.

Figure 13:
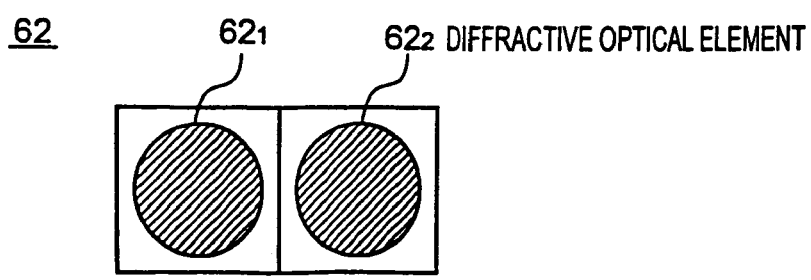
FIG. 13 is a plan view illustrating a pair of diffractive optical elements used in FIG. 12.

The pair of diffractive optical elements 62 is a pair of diffractive optical elements $62_1$ and $62_2$ having the same operation as the diffractive optical element 42, as shown in FIG. 13. The diffractive optical element $62_1$ is a surface-relief diffractive optical element in which concentric patterns having an uneven shape and the relatively-large period p (for example, 20 µm) are formed on the surface of a transparent material such as fused silica and the sectional shape is a saw-tooth shape. As shown in FIG. 13, the diffractive optical element $62_1$ generates (from the p-polarized beam 55) a p-polarized non-diffracting beam 64 having a predetermined beam diameter (for example, 15 µm) and a predetermined focal depth. Similarly, the diffractive optical element $62_2$ is a surface-relief diffractive optical element in which concentric patterns having the uneven shape and the relatively-large period p (for example, 20 µm) are formed on the surface of transparent material such as fused silica, and the sectional shape is a saw-tooth shape. As shown in FIG. 13, the diffractive optical element $62_2$ generates from the s-polarized beam 56 an s-polarized non-diffracting beam 65 having a predetermined beam diameter (for example, 15 µm) and a predetermined focal depth.

The respective optical systems $63_1$ and $63_2$ comprise lenses 44 and 45 and a spatial filter 46, similarly to the optical system 43 shown in FIG. 9. The optical system $63_1$ reduces the p-polarized non-diffracting beam 64 and generates the p-polarized non-diffracting beam 66 having only the Fourier transform pattern (ring light) of the p-polarized non-diffracting beam 64. The optical system $63_2$ reduces the s-polarized non-diffracting beam 65 and generates the s-polarized non-diffracting beam 67 having only the Fourier transform pattern (ring light) of the s-polarized non-diffracting beam 65.

In addition, the methods of manufacturing a micro lens sheet shaping die and a micro lens sheet with the laser processing apparatus having the above-mentioned configuration are substantially equal to those of the third embodiment, except that two etching holes 12 are formed at once, and thus the description thereof will be omitted.

According to the configuration of this embodiment, the laser beam 5 is split into the p-polarized beam 55 and the s-polarized beam 56 with the half-wave plate 52 and the polarization split element 53, the p-polarized non-diffracting beam 64 and the s-polarized non-diffracting beam 65 are generated from the p-polarized beam 55 and the s-polarized beam 56 with the pair of diffractive optical elements 62, and the p-polarized non-diffracting beam 66 and the s-polarized non-diffracting beam 67 are generated with the optical systems $63_1$ and $63_2$. Therefore, in addition to the advantages obtained from the first embodiment, since two etching holes 12 are formed at once, it is possible to form the etching holes 12 having a desired shape and a desired gap in the metal film 8 formed on the substrate 7 in a shorter time.

Sixth Embodiment

Figure 15:
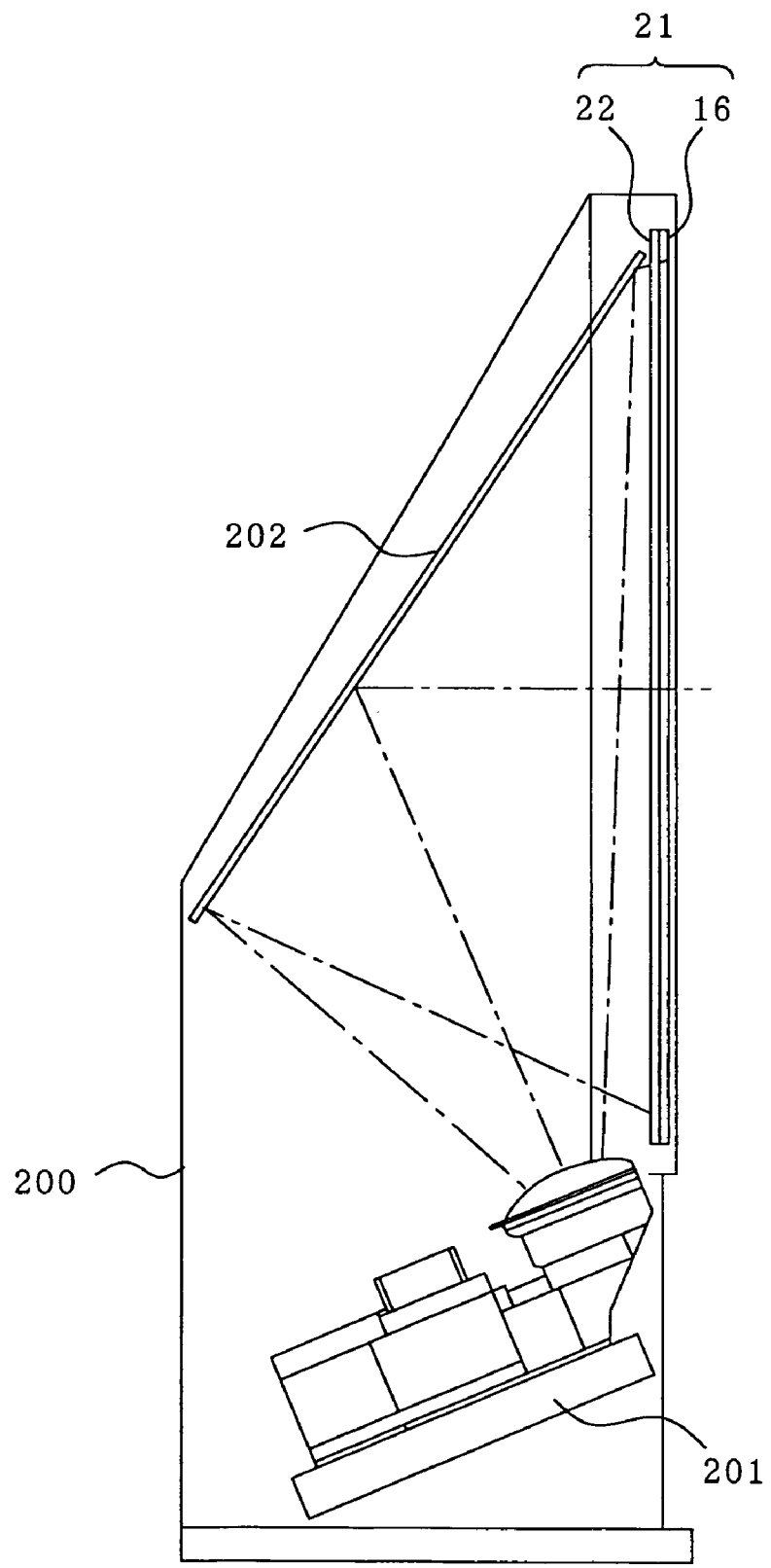
FIG. 15 is a schematic diagram illustrating a configuration of a projector according to a sixth embodiment of the present invention.

FIG. 15 is a schematic diagram illustrating a display device comprising a transmission screen having the micro lens sheet (equivalent to a micro lens array) formed by utilizing the micro lens sheet shaping die manufactured with the substrate processing method described in the above embodiments as a casting mold, filling the shaping die with a resin and curing the resin, and then separating the shaping die from the resin. The transmission screen can be constructed with the micro lens sheet obtained using the above method, or through proper combination of the micro lens sheet with other sheets such as a Fresnel lens sheet, a prism lens sheet, a diffusion sheet, etc. The transmission screen obtained through the combination of the micro lens sheet 16 and the Fresnel lens sheet 22 shown in FIG. 6 has an advantage that the screen surface is bright and the viewing angle is wide. The display device shown in FIG. 15 is a so-called rear projector, where an image projected from a projection optical unit 201 provided inside a case 200 is reflected from a mirror 202 and then is displayed through the transmission screen 21.

Seventh Embodiment

Figure 16:
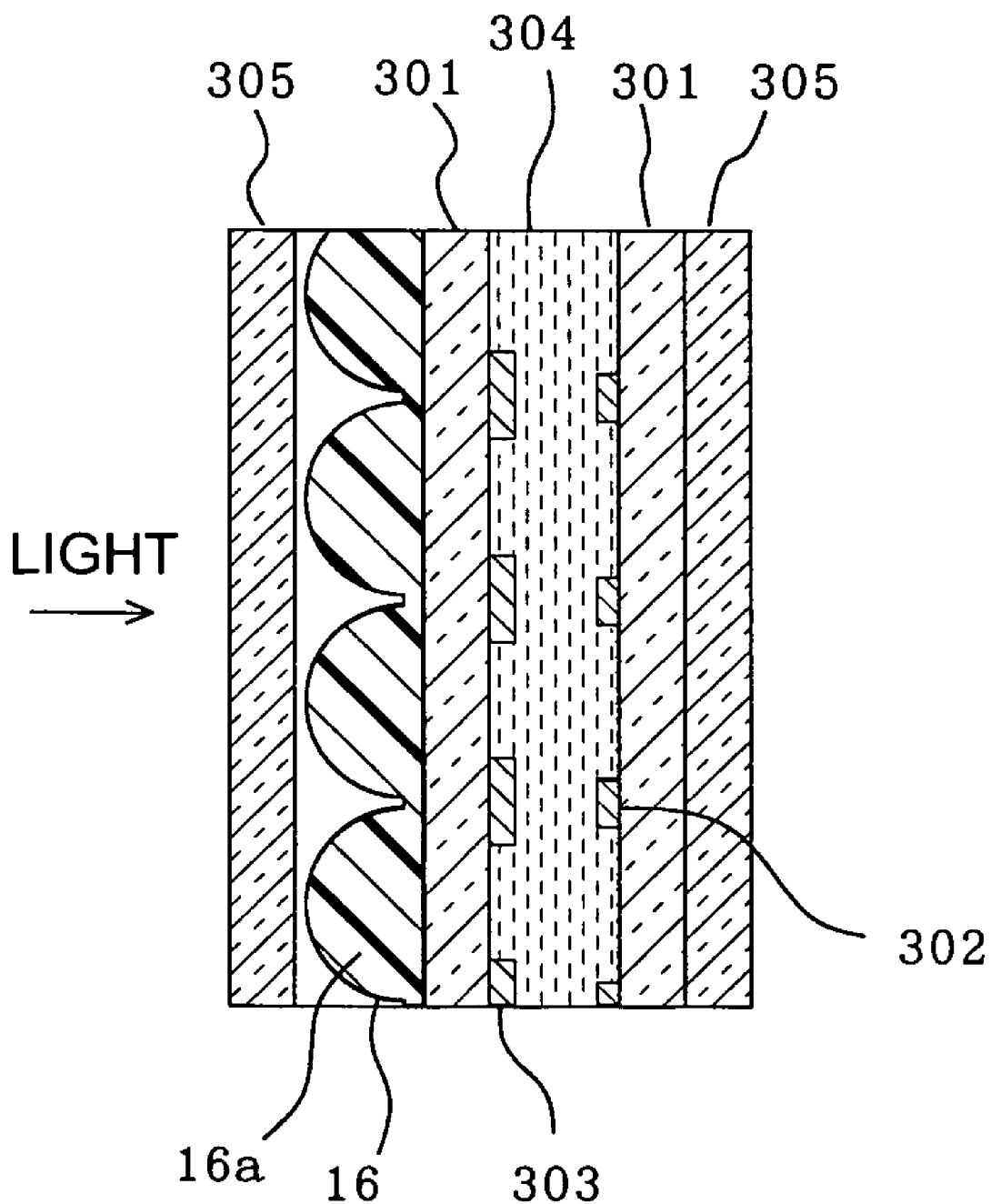
FIG. 16 is a schematic diagram illustrating a configuration of a display device according to a seventh embodiment of the present invention.

FIG. 16 is a schematic diagram illustrating a TFT liquid crystal panel as a display device comprising the micro lens sheet (equivalent to a micro lens array) formed by utilizing the micro lens sheet shaping die manufactured with the substrate processing method described in the above embodiments as a casting mold, filling the shaping die with a resin and curing the resin, and then separating the shaping die from the resin. Herein, a liquid-crystal 304 is sealed between a glass substrate 301 on which TFTs 302 are arranged and a glass substrate 301 on which a metal mask 303 is disposed. By providing the micro lens sheet 16 on the glass substrate 301 side on which the metal mask 303 is disposed and utilizing the respective micro lenses 16a, it is possible to effectively use the incident light. Herein, a dust-proof glass 305 is provided on the outer surface of the TFT liquid crystal panel.

Although the embodiments of the present invention have been hitherto described in detail with reference to the accompanying drawings, the specific configuration thereof is not limited to the above embodiments, and modifications of the designs, etc. without departing from the gist of the present invention are included in the present invention.

For example, in the above-mentioned embodiments, although the method of manufacturing a micro lens sheet shaping die has been exemplified for the present invention, application of the present invention is not limited to the embodiments, and the present invention may be applied to any other substrate processing. For example, by processing a glass substrate or a resin substrate using the present invention, a lens array having a plurality of concave lenses may be manufactured.

In the first to fifth embodiments described above, it has been exemplified that the sectional shape of the diffractive optical elements 3, 31, 42, $54_1$, $54_2$, $62_1$, and $62_2$ is a saw-tooth shape, but the present invention is not limited to the embodiments. For example, the sectional shape of the diffractive element may be a rectangular shape, where the light utilization efficiency can be reduced.

Figure 14:
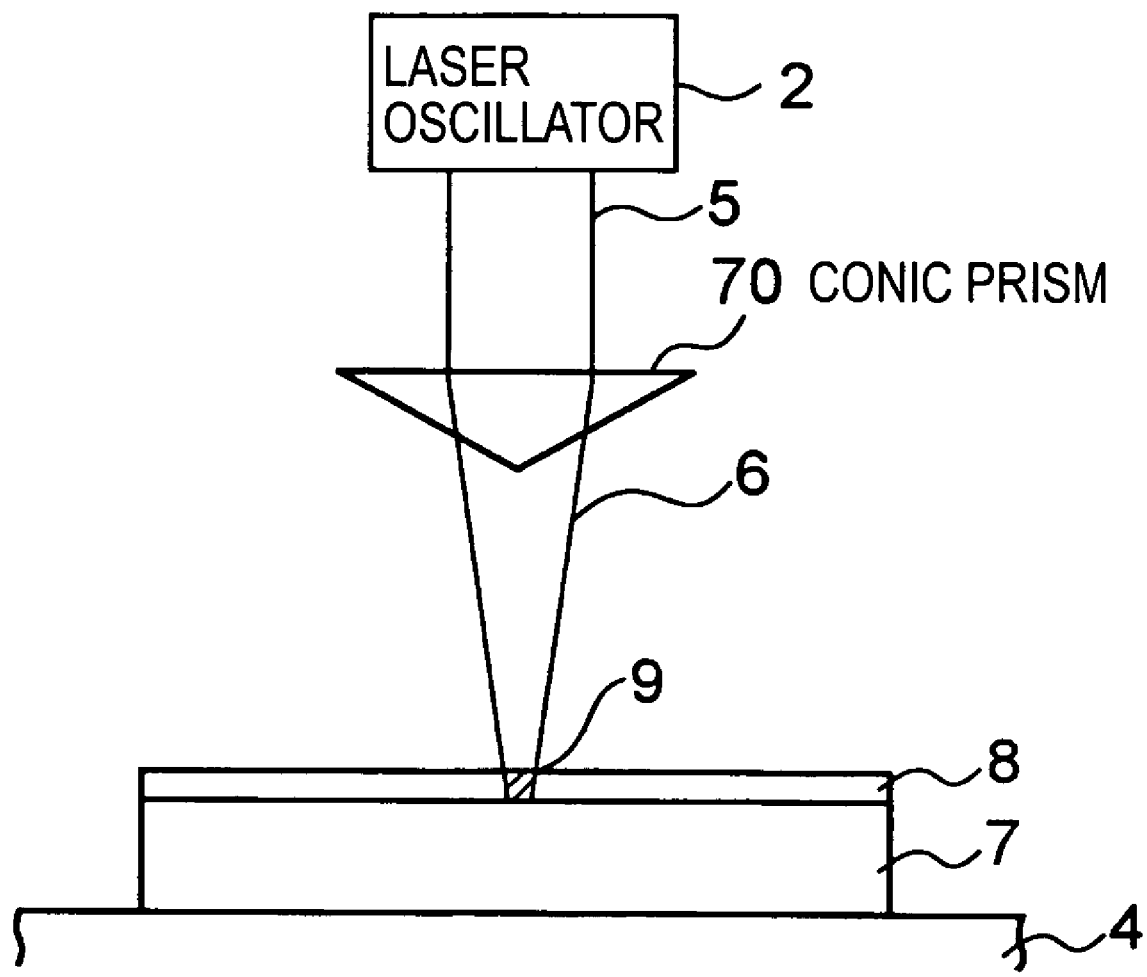
FIG. 14 is a schematic diagram illustrating another configuration of the laser processing apparatus used in the present invention.

In the first to fifth embodiments described above, the diffractive optical elements 3, 31, 42 or the diffractive optical elements $54_1$, $54_2$, $62_1$, and $62_2$ have been exemplified as an optical element for shaping an intensity distribution of a beam, but a conic prism may be used instead. An example of the laser processing apparatus employing a conic prism 70 is shown in FIG. 14. Since the conic prism uses the refracting operation and thus the wavelength dependency thereof is very small, one conic prism can be applied to plural laser beams having different wavelengths and substantially the same light utilization efficiency as that of the diffractive optical element is obtained. However, since the refraction angles are different by wavelengths, the beam diameters of the laser beam are different by wavelengths.

The respective embodiments described above can utilize the techniques of different embodiments, if particular contradictions or problems do not exist in the object and configuration. For example, in the above-mentioned second embodiment, the half-wave plate 52 and the polarization split element 53 shown in FIG. 10 may be provided at the rear side of the laser oscillator 2 and two diffractive optical elements 3 or 31 may be provided in parallel at the rear side of the polarization split element 53. The number of the diffractive optical elements 31 and 42 or the diffractive optical elements $54_1$, $54_2$, $62_1$, and $62_2$ provided in parallel is not limited to two, but may be three, four, five or more. According to this configuration, since plural etching holes 12 are formed at once, it is possible to form the etching holes having a desired shape and gap in the metal film formed on the substrate in a shorter time.

What is claimed is:

1. A substrate processing method comprising:
   a step of shaping a laser beam emitted from a laser beam source into a beam having a focal depth larger than a maximum value of variation in thickness of a processing area portion of a substrate to be processed and larger than a maximum value of variation in bend of the processing area portion by making the laser beam pass through a surface-relief diffractive optical element for performing phase modulation on a wavefront of the laser beam, the shaped beam having a sectional area smaller than that of the laser beam before the shaping step, the surface-relief diffractive optical element having a surface with concentric patterns of an uneven saw-tooth sectional shape, and the concentric patterns being formed at equivalent intervals on the surface according to a preselected period based on the maximum value of variation in thickness of the processing area portion and the maximum value of variation in bend of the processing area portion;
   a step of forming plural etching holes by irradiating the shaped beam onto a film formed on the substrate to remove the film; and
   a step of forming plural recessed portions by etching the substrate through the plural etching holes.

2. The substrate processing method according to claim 1, wherein the shaped beam having an intensity distribution where most optical energy is concentrated and localized in only a predetermined depth range along an optical axis is generated using a the surface-relief diffractive optical element.

3. The substrate processing method according to claim 2, wherein the shaped beam is generated by dividing the laser beam emitted from the laser beam source into plural laser beams and diffracting each of the plural laser beams with a diffractive optical element provided for each laser beam.

4. The substrate processing method according to claim 2, further comprising: a step of further adjusting the intensity distribution of the shaped beam by making the shaped beam output from the surface-relief diffractive optical element pass through an optical system in which a first lens having a first focal length, a spatial filter, and a second lens having a second focal length are sequentially provided.

5. The substrate processing method according to claim 1, wherein an intensity distribution of the laser beam emitted from the laser beam source is a Gaussian distribution.

6. The substrate processing method according to claim 1, wherein the substrate is formed of a light-transmitting member and the shaped beam is irradiated onto the film from a side of the substrate opposite the film.

7. A substrate processing method of manufacturing a lens array having plural concave lenses, comprising:
   a step of shaping a laser beam emitted from a laser beam source into a beam having a focal depth larger than a maximum value of variation in thickness of a processing area portion of one of a glass substrate and a resin substrate to be processed and larger than a maximum value of variation in bend of the processing area portion by making the laser beam pass through a surface-relief diffractive optical element for performing phase modulation on a wavefront of the laser beam, the shaped beam having a sectional area smaller than that of the laser beam before the shaping step, the surface-relief diffractive optical element having a surface with concentric patterns of an uneven saw-tooth sectional shape, and the concentric patterns being formed at equivalent intervals on the surface according to a preselected period based on the maximum value of variation in thickness of the processing area portion and the maximum value of variation in bend of the processing area portion;
   a step of forming plural etching holes by irradiating the shaped beam onto a film formed on said one of the glass substrate and the resin substrate to remove the film; and
   a step of forming plural recessed portions by etching said one of the glass substrate and the resin substrate through the plural etching holes.

8. A substrate processing method of manufacturing a micro lens sheet shaping die having plural recessed portions, comprising:
   a step of shaping a laser beam emitted from a laser beam source into a beam having a focal depth larger than a maximum value of variation in thickness of a processing area portion of a substrate of the micro lens sheet shaping die and larger than a maximum value of variation in bend of the processing area portion by making the laser beam pass through a surface-relief diffractive optical element for performing phase modulation on a wavefront of the laser beam, the shaped beam having a sectional area smaller than that of the laser beam before the shaping step, the surface-relief diffractive optical element having a surface with concentric patterns of an uneven saw-tooth sectional shape, and the concentric patterns being formed at equivalent intervals on the surface according to a preselected period based on the maximum value of variation in thickness of the processing area portion and the maximum value of variation in bend of the processing area portion;
   a step of forming plural etching holes by irradiating the shaped beam onto a film formed on the substrate to remove the film; and
   a step of forming the plural recessed portions by etching the substrate through the plural etching holes.

9. A method of manufacturing a micro lens sheet having plural convex micro lenses, comprising:
   a step of shaping a laser beam emitted from a laser beam source into a beam having a focal depth larger than a maximum value of variation in thickness of a processing area portion of a substrate of a shaping die and larger than a maximum value of variation in bend of the processing area portion by making the laser beam pass through a surface-relief diffractive optical element for performing phase modulation on a wavefront of the laser beam, the shaped beam having a sectional area smaller than that of the laser beam before the shaping step, the surface-relief diffractive optical element having a surface with concentric patterns of an uneven saw-tooth sectional shape, and the concentric patterns being formed at equivalent intervals on the surface according to a preselected period based on the maximum value of variation in thickness of the processing area portion and the maximum value of variation in bend of the processing area portion;

a step of forming plural etching holes by irradiating the shaped beam onto a film formed on the substrate to remove the film;

a step of forming plural recessed portions by etching the substrate through the plural etching holes, thereby forming a recessed portion forming surface; and pressing one of glass and resin on the recessed portion forming surface of the shaping die to transfer the shape of the shaping die to said one of the glass and the resin.

* * * * *

UNITED STATES PATENT AND TRADEMARK OFFICE
CERTIFICATE OF CORRECTION

PATENT NO. : 7,255,806 B2 Page 1 of 1
APPLICATION NO. : 10/976248
DATED : August 14, 2007
INVENTOR(S) : Kazuto Yoshimura and Jun Amako It is certified that error appears in the above-identified patent and that said Letters Patent is hereby corrected as shown below:

Column 6, Line 37: "$I(z)=C_1z–exp(-C_2z^2);$" should be --$I(z)=C_1z \cdot exp(-C_2z^2);$--

Column 6, Line 50: "$z_c=(a/2)–(p/\lambda)–(1/m)$" should be --$z_c=(a/2) \cdot (p/\lambda) \cdot (1/m)$--

Column 6, Line 65: "$I(z_c)=(\pi a l_0/exp(1/2))m(\lambda/p)$" should be
--$I(z_c)=(\pi a l_0/exp(1/2)) \cdot m(\lambda/p)$--

Column 10, Lines 32-33: "$I(z)=|\iint exp(ik(z^2+r^2)^{1/2}+\varphi(r))[[x]](z/(z^2+r^2))rdrd\theta[[)]]|^2$" should be --$I(z)=|\iint exp(ik(z^2+r^2)^{1/2}+\varphi(r))(z/(z^2+r^2))rdrd\theta|^2$--

Column 10, Line 36: "$0 \leq \theta 2\pi.$" should be --$0 \leq \theta \leq 2\pi.$--

Column 17, Line 49: after "using" delete "a"

Signed and Sealed this

Twentieth Day of May, 2008

JON W. DUDAS
*Director of the United States Patent and Trademark Office*